(12) United States Patent
Gottlieb

(10) Patent No.: US 9,711,181 B2
(45) Date of Patent: Jul. 18, 2017

(54) SYSTEMS AND METHODS FOR CREATING, EDITING AND PUBLISHING RECORDED VIDEOS

(71) Applicant: SHINDIG, INC., New York, NY (US)

(72) Inventor: Steven M. Gottlieb, New York, NY (US)

(73) Assignee: Shindig. Inc., New York, NY (US)

( * ) Notice: Subject to any disclaimer, the term of this patent is extended or adjusted under 35 U.S.C. 154(b) by 38 days.

(21) Appl. No.: 14/810,268

(22) Filed: Jul. 27, 2015

(65) Prior Publication Data

US 2016/0027471 A1    Jan. 28, 2016

Related U.S. Application Data

(60) Provisional application No. 62/028,998, filed on Jul. 25, 2014.

(51) Int. Cl.
*G11B 27/031* (2006.01)
*G06F 3/0484* (2013.01)
*G06F 3/0482* (2013.01)
*G11B 27/34* (2006.01)
*G11B 27/10* (2006.01)

(52) U.S. Cl.
CPC .......... *G11B 27/031* (2013.01); *G06F 3/0482* (2013.01); *G06F 3/04842* (2013.01); *G11B 27/102* (2013.01); *G11B 27/34* (2013.01)

(58) Field of Classification Search
None
See application file for complete search history.

(56) References Cited

U.S. PATENT DOCUMENTS

| | | | |
|---|---|---|---|
| 6,044,146 | A | 3/2000 | Gisby et al. |
| 6,241,612 | B1 | 6/2001 | Heredia |
| 6,259,471 | B1 | 7/2001 | Peters et al. |
| 6,559,863 | B1 | 5/2003 | Megiddo |
| 6,654,346 | B1 | 11/2003 | Mahalingaiah et al. |
| 6,697,614 | B2 | 2/2004 | Dorenbosch |
| 7,478,129 | B1 | 1/2009 | Chemtob |

(Continued)

FOREIGN PATENT DOCUMENTS

| | | |
|---|---|---|
| CA | 2771785 A | 3/2011 |
| CA | 2774014 A | 4/2011 |

(Continued)

OTHER PUBLICATIONS

About TokBox, Inc., All about TokBox, http://www.tokbox.com/about, retrieved Feb. 4, 2011, p. 1.

(Continued)

*Primary Examiner* — Eileen Adams
(74) *Attorney, Agent, or Firm* — Robert W. Morris; Eckert Seamans Cherin & Mellott, LLC

(57) ABSTRACT

Systems and methods for creating, editing and publishing recorded videos based on user selected edit points are described herein. The present invention transforms a recorded video and user selected edit points into a customized presentable video. A video editing tool analyzes a recorded video and flags occurrences of user selected edit points. The video editing tool then creates a customized video that can include video portions based on user selected edit points. The video can also include flags for a user to jump from edit point to edit point.

21 Claims, 10 Drawing Sheets

(56) References Cited

U.S. PATENT DOCUMENTS

| | | |
|---|---|---|
| 7,487,211 B2 | 2/2009 | Beavers et al. |
| 7,495,687 B2 | 2/2009 | DuMas et al. |
| 7,515,560 B2 | 4/2009 | DuMas et al. |
| 7,593,032 B2 | 9/2009 | Civanlar et al. |
| 7,958,457 B1 | 6/2011 | Brandenberg et al. |
| 8,060,560 B2 | 11/2011 | Vonog et al. |
| 8,144,187 B2 | 3/2012 | Moore et al. |
| 8,171,154 B2 | 5/2012 | Vonog et al. |
| 8,225,127 B2 | 7/2012 | Vonog et al. |
| 8,390,670 B1 | 3/2013 | Gottlieb |
| 8,405,702 B1 | 3/2013 | Gottlieb |
| 8,429,704 B2 | 4/2013 | Vonog et al. |
| 8,458,328 B2 | 6/2013 | Dubovik et al. |
| 8,463,677 B2 | 6/2013 | Vonog et al. |
| 8,527,654 B2 | 9/2013 | Vonog et al. |
| 8,549,167 B2 | 10/2013 | Vonog et al. |
| 8,647,206 B1 | 2/2014 | Gottlieb |
| 8,779,265 B1 | 7/2014 | Gottlieb |
| 8,902,272 B1 | 12/2014 | Gottlieb |
| 8,929,516 B2 | 1/2015 | Odinak |
| 9,124,760 B2 | 9/2015 | Gottlieb |
| 9,215,412 B2 | 12/2015 | Gottlieb |
| 2002/0094831 A1 | 7/2002 | Maggenti et al. |
| 2002/0165921 A1 | 11/2002 | Sapieyevski |
| 2002/0169014 A1 | 11/2002 | Egozy et al. |
| 2003/0000369 A1 | 1/2003 | Funaki |
| 2003/0014262 A1 | 1/2003 | Kim |
| 2003/0164084 A1 | 9/2003 | Redmann et al. |
| 2004/0022202 A1 | 2/2004 | Yang et al. |
| 2005/0032539 A1 | 2/2005 | Noel et al. |
| 2005/0078613 A1 | 4/2005 | Covell et al. |
| 2005/0132288 A1 | 6/2005 | Kirn et al. |
| 2005/0143135 A1 | 6/2005 | Brems et al. |
| 2005/0262542 A1 | 11/2005 | DeWeese et al. |
| 2006/0055771 A1 | 3/2006 | Kies |
| 2006/0063555 A1 | 3/2006 | Robbins |
| 2006/0112814 A1 | 6/2006 | Paepcke |
| 2006/0114314 A1 | 6/2006 | Dunko |
| 2006/0140138 A1 | 6/2006 | Hill |
| 2007/0039449 A1 | 2/2007 | Redmann |
| 2007/0140510 A1 | 6/2007 | Redmann |
| 2007/0255816 A1 | 11/2007 | Quackenbush et al. |
| 2007/0265074 A1 | 11/2007 | Akahori et al. |
| 2008/0002668 A1 | 1/2008 | Asokan et al. |
| 2008/0037763 A1 | 2/2008 | Shaffer et al. |
| 2008/0136898 A1 | 6/2008 | Eisenberg et al. |
| 2008/0137559 A1 | 6/2008 | Sasaki et al. |
| 2008/0181260 A1 | 7/2008 | Vonog et al. |
| 2008/0190271 A1 | 8/2008 | Taub et al. |
| 2008/0232248 A1 | 9/2008 | Barave et al. |
| 2008/0274810 A1 | 11/2008 | Hayashi et al. |
| 2009/0033737 A1 | 2/2009 | Goose et al. |
| 2009/0040289 A1 | 2/2009 | Hetherington et al. |
| 2009/0054107 A1 | 2/2009 | Feland, III et al. |
| 2009/0070420 A1 | 3/2009 | Quackenbush |
| 2009/0172200 A1 | 7/2009 | Morrison et al. |
| 2009/0186605 A1 | 7/2009 | Apfel et al. |
| 2009/0209339 A1 | 8/2009 | Okada |
| 2009/0249244 A1 | 10/2009 | Robinson et al. |
| 2010/0122184 A1 | 5/2010 | Vonog et al. |
| 2010/0165904 A1 | 7/2010 | Woodward et al. |
| 2010/0198992 A1 | 8/2010 | Morrison et al. |
| 2010/0281375 A1* | 11/2010 | Pendergast ........... G11B 27/034 715/723 |
| 2010/0316232 A1 | 12/2010 | Acero et al. |
| 2011/0011244 A1 | 1/2011 | Homburg |
| 2011/0011246 A1 | 1/2011 | Buskies et al. |
| 2011/0055317 A1 | 3/2011 | Vonog et al. |
| 2011/0078532 A1 | 3/2011 | Vonog et al. |
| 2011/0179180 A1 | 7/2011 | Schleifer et al. |
| 2011/0201414 A1* | 8/2011 | Barclay ............... G07F 17/3206 463/25 |
| 2011/0258474 A1 | 10/2011 | Vonog et al. |
| 2012/0038550 A1 | 2/2012 | Lemmey et al. |
| 2012/0039382 A1 | 2/2012 | Vonog et al. |
| 2012/0041859 A1 | 2/2012 | Vonog et al. |
| 2012/0060101 A1 | 3/2012 | Vonog et al. |
| 2012/0084456 A1 | 4/2012 | Vonog et al. |
| 2012/0084672 A1 | 4/2012 | Vonog et al. |
| 2012/0110162 A1 | 5/2012 | Dubovik et al. |
| 2012/0110163 A1 | 5/2012 | Dubovik et al. |
| 2012/0124128 A1 | 5/2012 | Vonog et al. |
| 2012/0127183 A1 | 5/2012 | Vonog et al. |
| 2012/0151541 A1 | 6/2012 | Vonog et al. |
| 2012/0192087 A1 | 7/2012 | Lemmey |
| 2012/0198334 A1 | 8/2012 | Surin et al. |
| 2012/0246227 A1 | 9/2012 | Vonog et al. |
| 2012/0249719 A1 | 10/2012 | Lemmy et al. |
| 2012/0254649 A1 | 10/2012 | Vonog et al. |
| 2012/0272162 A1 | 10/2012 | Surin et al. |
| 2012/0280905 A1 | 11/2012 | Vonog et al. |
| 2012/0293600 A1 | 11/2012 | Lemmy et al. |
| 2012/0297320 A1 | 11/2012 | Lemmey et al. |
| 2012/0326866 A1 | 12/2012 | Lemmey et al. |
| 2012/0331089 A1 | 12/2012 | Vonog et al. |
| 2012/0331387 A1 | 12/2012 | Lemmey et al. |
| 2013/0014027 A1 | 1/2013 | Lemmey |
| 2013/0014028 A1 | 1/2013 | Lemmey et al. |
| 2013/0019184 A1 | 1/2013 | Vonog et al. |
| 2013/0021431 A1 | 1/2013 | Lemmey et al. |
| 2013/0088518 A1 | 4/2013 | Lemmey et al. |
| 2013/0109302 A1 | 5/2013 | Levien et al. |
| 2013/0121503 A1 | 5/2013 | Ankolekar et al. |
| 2013/0156093 A1 | 6/2013 | Vonog et al. |
| 2013/0191479 A1 | 7/2013 | Gottlieb |
| 2013/0216206 A1* | 8/2013 | Dubin .................... H04N 7/155 386/282 |
| 2013/0330062 A1* | 12/2013 | Meikle .................. H04N 9/87 386/285 |
| 2014/0033900 A1 | 2/2014 | Chapman et al. |
| 2014/0229866 A1 | 8/2014 | Gottlieb |
| 2015/0054911 A1 | 2/2015 | Gottlieb |
| 2015/0106227 A1 | 4/2015 | Gottlieb |
| 2015/0116448 A1 | 4/2015 | Gottlieb |
| 2015/0301694 A1 | 10/2015 | Gottlieb |
| 2015/0301720 A1 | 10/2015 | Gottlieb |
| 2015/0304376 A1 | 10/2015 | Gottlieb |
| 2015/0304608 A1 | 10/2015 | Gottlieb |
| 2015/0326458 A1 | 11/2015 | Gottlieb |
| 2015/0328545 A1 | 11/2015 | Gottlieb |
| 2015/0334142 A1 | 11/2015 | Gottlieb |

FOREIGN PATENT DOCUMENTS

| | | |
|---|---|---|
| EP | 0721726 A | 12/2000 |
| EP | 2471221 A | 7/2012 |
| EP | 2484091 A | 8/2012 |
| EP | 2630630 A | 8/2013 |
| EP | 2636194 A | 9/2013 |
| GB | 2446529 A | 8/2008 |
| WO | 2009077936 A | 6/2009 |
| WO | 2011025989 A | 3/2011 |
| WO | 2011041229 A | 4/2011 |
| WO | 2012021173 A | 2/2012 |
| WO | 2012021174 A | 2/2012 |
| WO | 2012021901 A | 2/2012 |
| WO | 2012054089 A | 4/2012 |
| WO | 2012054895 A | 4/2012 |
| WO | 2012060977 A | 5/2012 |
| WO | 2012060978 A | 5/2012 |
| WO | 2012103376 A | 8/2012 |
| WO | 2012135384 A | 10/2012 |
| WO | 2012151471 A | 11/2012 |
| WO | 2012177641 A | 12/2012 |
| WO | 2012177779 A | 12/2012 |
| WO | 2013149079 A | 10/2013 |

OTHER PUBLICATIONS

CrunchBase Profile, CrunchBase readeo, http://www.crunchbase.com/company/readeo, retrieved Feb. 3, 2011, pp. 1-2.

CrunchBase Profile, CrunchBase Rounds, http://www.crunchbase.com/company/6rounds, retrieved Feb. 4, 2011, pp. 1-2.

(56) References Cited

OTHER PUBLICATIONS

CrunchBase Profile, CrunchBase TokBox, http://www.crunchbase.com/company/tokbox, retrieved Feb. 4, 2011, pp. 1-3.
Online Collaboration GoToMeeting, http://www.gotomeeting.com/fec/online_collaboration, retrieved Feb. 4, 2011, pp. 1-4.
Readeo Press Release, www.mmpublicity.com, Feb. 25, 2010, pp. 1-2.
Rounds.com, Make friends online and enjoy free webcam chats, http://www.rounds.com/about, retrieved Feb. 4, 2011, pp. 1-3.

* cited by examiner

SYSTEMS AND METHODS FOR CREATING, EDITING AND PUBLISHING RECORDED VIDEOS

CROSS-REFERENCE TO RELATED APPLICATIONS

This application claims the benefit of U.S. Provisional patent application No. 62/028,998, filed Jul. 25, 2014, the disclosure of which is incorporated herein by reference in its entirety.

FIELD OF THE INVENTION

This disclosure generally relates to systems and methods for creating, editing and publishing recorded videos.

BACKGROUND OF THE INVENTION

Some traditional video editors allow users to edit videos, but such systems often provide inadequate options for users to accurately and quickly edit portions of video. This process is typically cumbersome. For example, if a user taping a politician's speech only wanted to view portions of the speech related to the economy, a user would have to go through the entire speech, stop the recording at various points, figure out the economy is being discussed, and then record those portions, in order to edit out any irrelevant or unwanted portions. Once the user was left with only portions of the speech about the economy, the user would then have to combine the economy video portions to make a recording of the politician's speech that only included the portions related to the economy.

This arduous process typically takes an exorbitant amount of time and leaves a user with an unpresentable video having choppy transitions between each video portion. On top of being left with an unpresentable video, the user would have to spend the time watching the entire video. Continuing the above example, once the user combines the economy video portions, each portion would end and start abruptly with no discernable transition or prompt. Furthermore, a user would still have to search through the entire new video to find a specific portion. This can make the entire process overwhelming and exhaustive.

SUMMARY OF THE INVENTION

A method for in-line editing of a video is described herein. Online events, such as educational classes, conferences, meetings, or chats, often provide memorable moments or situations that a user may desire to capture and share. This online event may be recorded. A user may then select one or more edit points within a recorded online event. These edit points may include the amount of time elapsed in the video, a pause in the conversation, a selected user speaking, a change in the conversation state and an introduction of multimedia.

A video editing tool may then determine each time the type of edit point occurs within the video. Each time the edit point occurs within the video, the server may flag the edit point. This flag may alter the video file itself. The video editing tool may then present the video with the created flags using a device. This presentation of the flagged video allows the user to easily playback flagged portions of the recorded online event on the user device. This video may then be published using a variety of social media.

A method for creating a customized video based using a recorded video is described herein. Videos may be recorded. A user may then select an edit point for a video. This edit point may be the amount of time in the video, a specific sound, a type of action and an introduction of multimedia.

A video editing tool may then flag a plurality of occurrences of the selected edit point. Then the video editing tool may create a first video portion. The first video portion may be based on the first flagged occurrence of the user selected edit point. The video editing tool may then create a second video portion. The second video portion may be based on the second flagged occurrence of the user selected edit point. The video editing tool may then create a new video combining the first and second video portions.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION OF THE INVENTION

The present invention may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features. Furthermore, in at least some embodiments, liked referenced numerals refer to like parts throughout.

Figure 1:
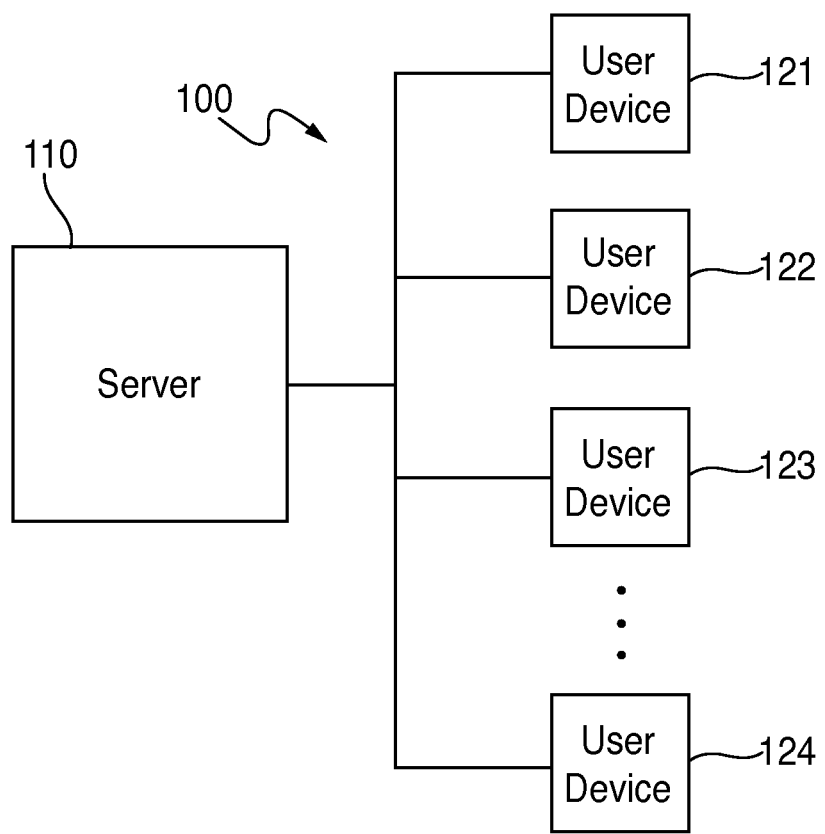
FIG. 1 is a schematic view of an illustrative communications system in accordance with various embodiments.

FIG. 1 is a schematic view of an illustrative communications system in accordance with various embodiments. In some embodiments, a communications system may facilitate communications between user devices. Communications system 100 may include at least one server 110. Server 110 can be any suitable server for facilitating communications between two or more users devices. For example, server 110 may include several interconnected computers running software to control communications.

Communications system 100 may include several user devices 121-124. Server 110 may be coupled with user devices 121-124 through any suitable network. For example, server 110 may be coupled with user devices 121-124 through Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP ("VOIP")), any other communications protocol, or any combination thereof. Each of user devices 121-124 may include an electronic device (e.g., a personal computer or a personal communications system). In some embodiments, each user device may correspond to a single user. For example, user device 121 may correspond to a first user and user device 122 may correspond to a second user. Server 110 may control communications between two or more of the user devices. For example, server 110 may control one-to-one communications between user device 121 and 122 and/or multi-party communications between user device 121 and user devices 122-124. Each user device may provide outputs to a user and receive inputs from the user when facilitating communications. For example, a user device may include one or more output interfaces (e.g., display screen or audio output) for providing communication outputs to a user and one or more input interfaces (e.g., a controller, joystick, keyboard, or mouse) for receiving communication inputs from a user.

While only one server and four user devices (e.g., devices 121-124) are shown in FIG. 1, it is understood that any number of servers and user devices can be provided in a communications system. A more detailed description of a user device 121 can be found in the description of FIG. 1A below. A more detailed description of suitable communications systems for facilitating user communications can be found in commonly assigned U.S. Pat. No. 8,405,702, which issued on Mar. 26, 2013, commonly assigned U.S. Pat. No. 8,390,670, which issued on Mar. 5, 2013, commonly assigned U.S. Pat. No. 8,902,272, which issued on Dec. 2, 2014, commonly assigned U.S. Pat. No. 8,917,310, which issued on Dec. 23, 2014, and commonly assigned U.S. Pat. No. 9,041,768, which issued on May 26, 2015, is the disclosures of each hereby incorporated herein by reference in their entirety.

In accordance with the present disclosure, a communications system may facilitate online events that may be recorded by any of the various users using a video editing tool. As used herein, the video editing tool may be any software, hardware, or combination of software and hardware stored on user devices 121-124 and/or server 110 that allows a user to perform one or more video editing techniques or actions. Online events, as described herein, may include, but not limited to, online classes, online chat forums, conferences, presentations, lectures, meetings, concerts, and personalized gatherings. While it is understood that many online events may include one or more video feeds, online events, as described herein, may include one or more video feeds, audio feed, or both video and audio feeds. Video, as described herein, is not limited to solely video data, but may also include audio data.

Figure 1A:
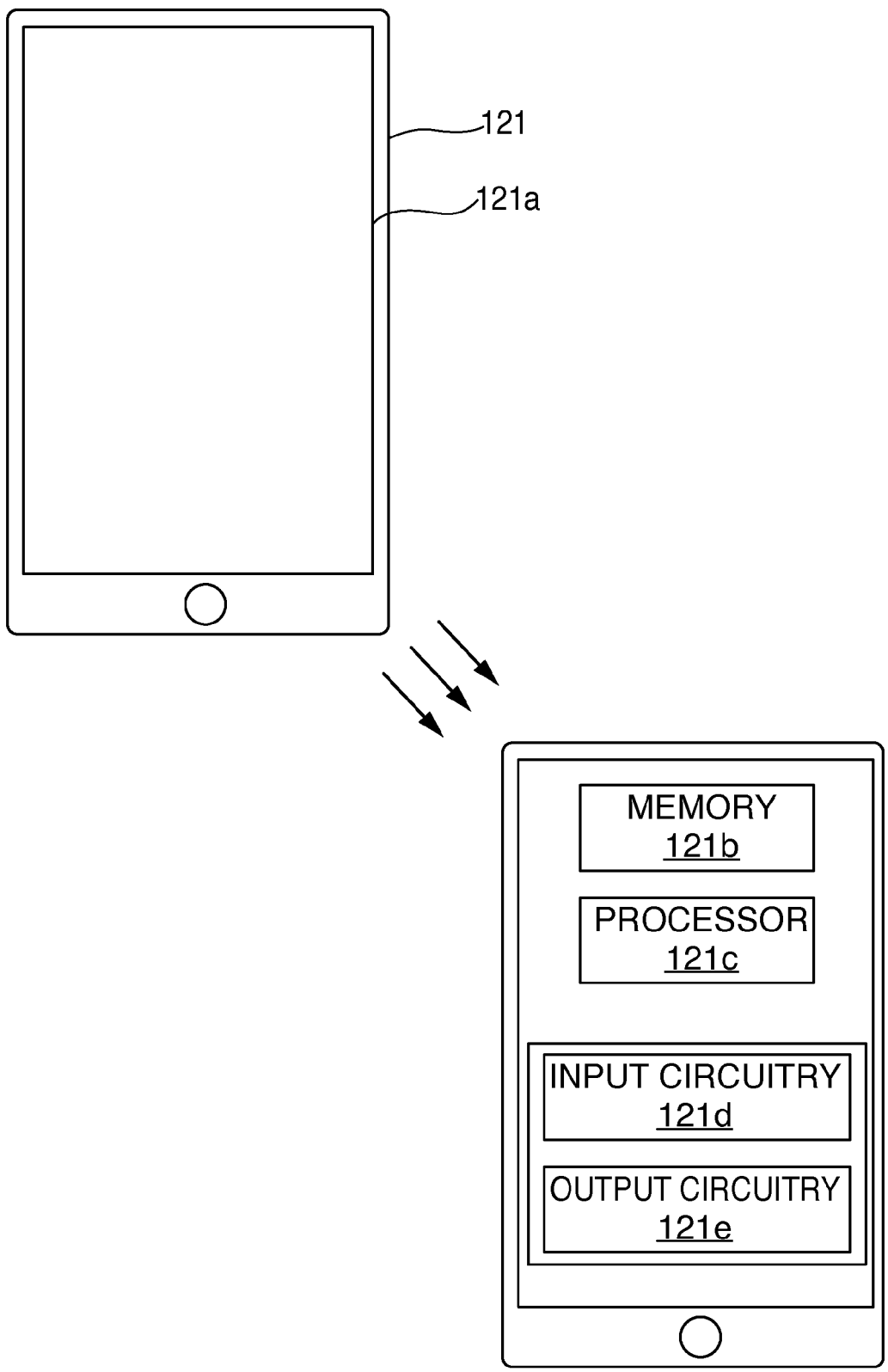
FIG. 1A is an illustrative diagram of an exemplary device in accordance with various embodiments.

FIG. 1A is an illustrative diagram of an exemplary device in accordance with various embodiments. Device 121, in some embodiments, may correspond to any electronic device or system. Various types of devices include, but are not limited to, portable media players, cellular telephones or smart phones, pocket-sized personal computers, personal digital assistants ("PDAs"), desktop computers, laptop computers, tablet computers, and/or electronic accessory devices such as smart watches and bracelets. In some embodiments, however, device 200 may also correspond to a network of devices.

Device 121, in some embodiments, may include display screen 121a, memory 121b, one or more processors 121c, input circuitry 121d, and output circuitry 121e. Persons of ordinary skill in the art will recognize that device 121 may include any number of components, and one or more additional components or modules may be added or omitted without deviating from the scope of the present disclosure. Additionally, one or more components may be combined or separated, and multiple instances of various components are also possible, however only one of each component is shown within device 200 for simplicity.

Display screen 121a may include any suitable mechanism and/or component for displaying inputs from a user or displaying outputs from the device 121. In some embodiments, display screen 121a may work with input circuitry 121d and output circuitry 121e. Display 121a may be any size and may be located on one or more regions/sides of device 121. For example, display 121a may fully occupy a first side of device 121, or may occupy a portion of the first side. Various display types may include, but are not limited to, liquid crystal displays ("LCD"), monochrome displays, color graphics adapter ("CGA") displays, enhanced graphics adapter ("EGA") displays, variable graphics array ("VGA") displays, or any other display type, or any combination thereof. In some embodiments, display 121a may be a touch screen and/or an interactive display. In some embodiments, the touch screen may include a multi-touch panel coupled to processor 121c. In some embodiments, display 121a may be a touch screen and may include capacitive sensing panels. In some embodiments, display 121a may also correspond to a component of input interface 121s, as it may recognize touch inputs.

Memory 121b may include any suitable form of memory, such as cache memory, semi-permanent memory (e.g., RAM), or any other memory type, or any combination of. In some embodiments, memory 121b may be used in place of and/or in addition to an external memory or storage unit or device for storing data on device 121. Memory 121b may also include, or may correspond to, one or more storage mediums. Various types of storage mediums may include, but are not limited to, hard-drives, solid state drives, flash memory, permanent memory (e.g., ROM), or any other storage type, or any combination thereof. Any form of data or content may be stored within storage memory 121b, such as photographs, music files, videos, contact information, applications, documents, or any other file, or any combination thereof.

Processor(s) 121c may include any suitable processing circuitry, such as one or more processors, capable of controlling the operations and functionality of device 121. In some embodiments, processor(s) 121c may facilitate communications between various components within device 121. For example, processor(s) 121c may cause output circuitry 121e to perform an associated output in response to one or more inputs being received by input circuitry 121d. Processor(s) 121c may also run an operating system for device 121, applications resident on device 121, firmware applications, media application, and/or any other type of application, or any combination thereof functioning on, or in conjunction with, device 121.

Input circuitry 121d may include any suitable mechanism and/or component for receiving inputs from a user operating device 121. In some embodiments, input circuitry 121d may operate through the use of a touch screen and/or an interactive touch sensitive display screen. For example, input circuitry 121d may operate through the use of a multi-touch panel coupled to processor(s) 121c, and may include one or more capacitive sensing panels. In some embodiments, input circuitry 121d may also correspond to a component or portion of output circuitry 121e which also may be connected to a touch sensitive display screen. For example, in response to detecting certain touch inputs, input circuitry 230 and processor(s) 121c may execute one or more functions for device 121 and/or may display certain content using output circuitry 121e.

Output circuitry 121e may include any suitable mechanism or component for generating outputs to a user operating device 121. Output circuitry 121e may operate display screen 121a, and may be any size or shape, and may be located on one or more regions/sides of device 121. For example, output circuitry 121e may operate display screen 121a that may fully occupy a first side of device 121. Output circuitry 121e may also operate display screen 121a that may only occupy a portion of a first side of device 121. In some embodiments, output interface 121e may include speaker. Speakers, as used herein, may correspond to any suitable mechanism for outputting audio signals. For example, speakers may include one or more speaker units, transducers, or array of speakers and/or transducers capable of broadcasting audio signals and audio content to a room where device 121 may be located. In some embodiments, speakers may correspond to headphones or ear buds capable of broadcasting audio directly to a user.

Figure 2:
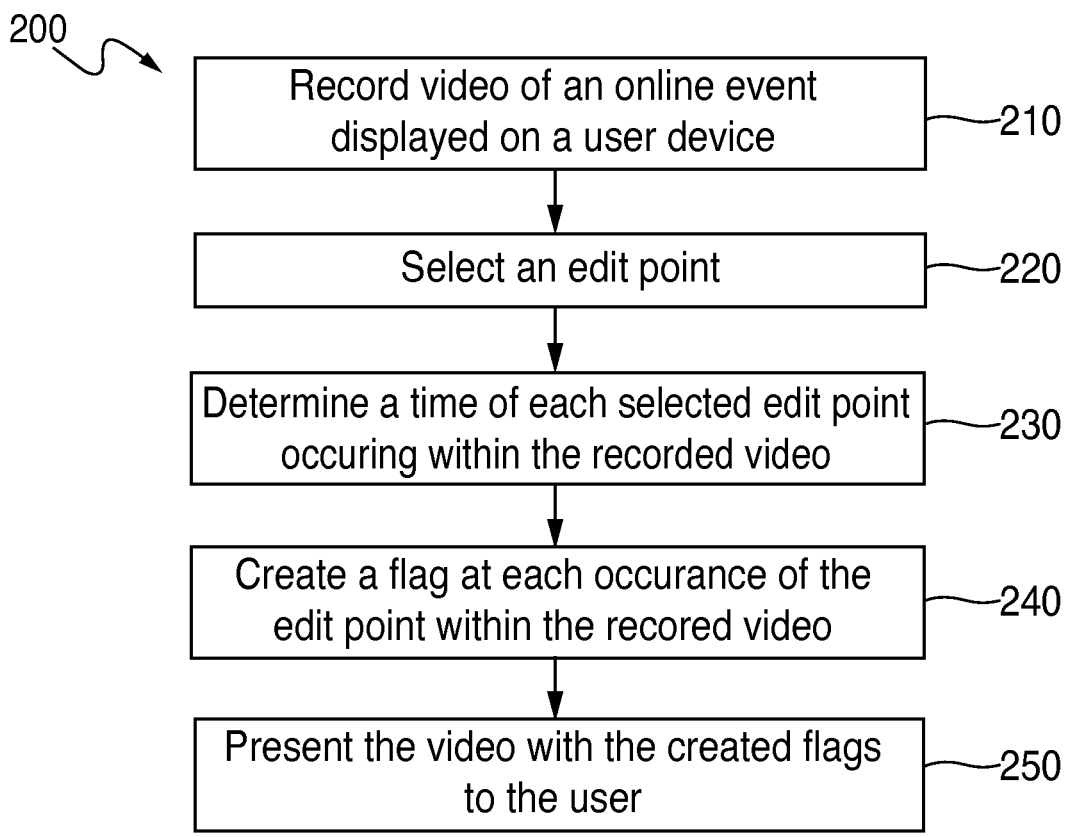
FIG. 2 is an illustrative flowchart of a process for editing a recorded video in accordance with various embodiments.

FIG. 2 is an illustrative flowchart of a process for editing a recorded online event in accordance with various embodiments. Process 200, in one exemplary embodiment, uses a video editing tool, stored locally on user devices 121-124 and/or on server 110, to transform recorded video and/or audio data into a video that may include user selected edit points. Furthermore, the video editing tool may find and flag each edit point within the video, and present the video on the user device (e.g., user devices 121-124) including the flagged portions and/or indicators for each flag within the video.

Process 200 of FIG. 2 may, in some embodiments, begin at step 210. At step 210, video from an online event displayed on a user device is recorded using a video editing tool. In some embodiments, the online event may be hosted on server 110 and displayed on each user device 121-124. Thus, each user device 121-124 may present the online event on their own display screen, and each user device 121-124 may record the online event to memory 121b using the video editing tool. However, in some embodiments, the video editing tool may record the online event on server 110 and store the recorded video on server 110. Each user device 121-124 may therefore access the recorded video using their previously established communication link with server 110.

At step 220 a user may selects one more edit points for the recorded video using the video editing tool. For example, a user recording a business meeting may want to flag each time profits are talked about. In this example, the user would select, as an edit point, the term profits. While this embodiment allows a user choose any edit point, in some embodiments, a user may select from a suggested edit point list including one or more video edits points. For example, the video editing tool may store in memory one or more of a user's frequently or previously used edit points, and present those edit points within the suggested edit point list. Various types of edit points may include, but are not limited to, one or more times (e.g., 1 hour, 6:00 PM EST, etc.), a pause in a conversation, a particular user speaking, a change in the conversation state, a change in audio or video intensity above a predefined threshold, a change in connectivity between the user device and server 110, and/or an introduction of multimedia. For example, if a user wants to only hear and see a host of an online event speaking, the user chooses "Selected User Edit Point" as a type of edit point to be used. In this particular scenario, whenever the host (or any other selected individual within the online event) provides communications to the online event, a flag will be created at that point in time within the recorded video of the online event.

At step 230, the video editing tool may determine a time of each occurrence of the selected edit point within the recorded online event. For example, a user may select the term "profits" as an edit point, and the video editing tool may then determine a time within the recorded online event when the term "profits" is spoken. Persons of ordinary skill in the art will also recognize that, in some embodiments, a specific keyword or phrase may be used to trigger an edit point, however in other embodiments, peripherally related terms or phrases may also trigger an edit point to occur. For example, using the aforementioned example of "profits" as a edit point term, each occurrence of the word "money," "revenue," "salary," "wages," and/or "pay" may also be flagged, and a time associated with the occurrence of these words may also be determined.

In some embodiments, the specific term or terms may be present within the recorded online event multiple times, in which case the video editing tool may find each time the term profits is mentioned in the recorded online event. The video editing tool may accomplish this by using both audio and video data. For example, when the word "profit" is spoken, the video editing tool would record a time in the recorded online event that the word was spoken.

In some embodiments, images relating to profits (or any other corresponding term) are visible in the online event, the video editing tool may record a time within the recorded online event that the phrase was displayed within the images. For example, if pie charts or graphs are being used in the online event, the video editing tool would record a time when the pie charts or graphs include information corresponding to profits.

The video editing tool may recognize audio and images in any number of ways. For example, to recognize audio within the recorded video of the online event, the video editing tool may use speech to text software or voice recognition software. When using speech to text software, the video editing tool may break down the speech in the recorded video into phonemes. The video editing tool may then analyzes the order, combination and context of the speech. After the video editing tool has broken down the speech and analyzed the speech's phonemes, the video editing tool may then search its database for words with similar phonemes. This database may be located on a server (e.g., server 110), in memory associated with the video editing tool, or within storage/memory on the user device (e.g., user devices 121-124). For words that sound similar, the video editing tool may rely on the context of the word within the recorded online event in order to determine which word is being used. For example, if the user wants to listen to only math problems, the video editing tool will look for, among other words, numbers that are spoken in the video. As another example, the host was talking about last night's dinner, the host may use the word "ate." Ordinarily, this may present a problem as the words "ate" and "eight" have similar pronunciations. However, the video editing tool may then use the context of the word in order to determine what the host was talking about (e.g., not math), and the video editing tool, in this particular instance, would not flag the word "ate."

The video editing tool may also use any suitable voice recognition software. The video editing tool use voice recognition software in a variety of ways. For example, the video editing tool may use a pattern matching technique. This would analyze each word that is spoken with the words stored in the video editing tool's data base to see if there is a match. As another example, the video editing tool may use pattern and feature analysis. In this type of analysis, the video editing tool may listen to each sound in the video. The video editing tool may then digitize the sound and convert the digital data (e.g., digitized sound) into a spectrogram. The spectrogram may then be digitally processed to find components of speech including the initial sound and may compare the spectrogram to a phonetic dictionary. The video editing tool may have a phonetic dictionary stored on server 110, in its own memory, or on user device 121-124. The video editing tool may then flag all recognized words that are related to the user selected edit point within the recorded online event.

The video editing tool may also recognize words or images that are displayed on the screen (e.g., display screen 121a) in the recorded video. For example, if the user has selected an edit point of exercise, the video editing tool may flag a time associated with when words like "run, jump, and pushups" are shown within the recorded video. To recognize images, the video editing tool may look for patterns and/or sequences in numerical data. In a video, each image includes pixels. A pixel is a minute area of illumination on a display screen. The video editing tool interprets each image's pixels as a series of numbers. To identify each image, the video editing tool may identify images by matching it with images having similar numerical series. If an image has a similar numerical series as another image, the video editing tool recognizes the images under the same subject. For example, if a user wants to flag each time the profits are being talked about, the video editing tool will look to each image on presented in the recorded video. The video editing tool will break down each image into numerical sequences. If the image has a similar numerical sequence to other images recognized as being under the subject of profits, the video editing tool will flag that time in the recorded video.

The video editing tool may look at both the video and audio at a substantially same time as looking for the user selected edit point. Every time the video editing tool recognizes the user selected edit point in either the audio or video data, the video editing tool records a time associated with the occurrence of the edit point. Persons of ordinary skill in the art will recognize that the video editing tool may recognize visual and/or audio data in any number of ways and the aforementioned techniques are merely exemplary.

At step 240, the video editing tool may create a flag at each occurrence of the edit point within the recorded online event. The video editing tool may alter the recorded online event file and place an indicator code and/or a time stamp at each recognized occurrence of the user selected edit point. Step 240 modifies the file itself, transforming the recorded online event into a flagged, usable, and editable video for the user. Continuing the aforementioned example regarding the keyword profits, the video editing tool may have stored a time when each edit point occurs within the recorded online event and the video editing tool may now flag each determined occurrence of the user selected edit point (e.g., "profit"). As mentioned above, the flags the video editing tool creates may include an indicator and a time stamp at each occurrence of the edit point. By including the flags at each occurrence of the edit point, a user may jump from edit point to edit point within the recorded video.

At step 250, the video editing tool presents the recorded video with the created flags to the user using a user device. For example, the user device may present the video accompanied with a time bar or waveform along the bottom to represent the time passed in the presented video. This time bar or waveform may have visual representations of the flags so that the user can select a particular edit point to jump to. When a user selects a visual representation of a flag, the video may jump to a time in the video associated with an occurrence of a particular edit point in the video. Returning to the previous example, the presented online event may allow the user to jump from one edit point to another edit point in order to hear different occurrences of profits being talked about. Thus, a user may be able to review a recorded online event and see only what the user wants and/or needs to see.

In some embodiments, the presented recorded video with the created flags may be published by the user. For example, if the user would like to show the presented video to a group of colleagues, the user may simply upload the video to a website. In other embodiments, the user may also use a social media application to publish the recorded video with the created flags. The user may also want to share the video with the created flags to other users who were accessing the online event. In some embodiments, the user may also send the recorded video with the created flags to the users who accessed the online event. In some embodiments, the user device may have a list of users that accessed the online event. When sending the video, the user may be prompted to select from a list of users who accessed the online event. The user may select some or all of the users to send the recorded video with flags to.

Figure 3:
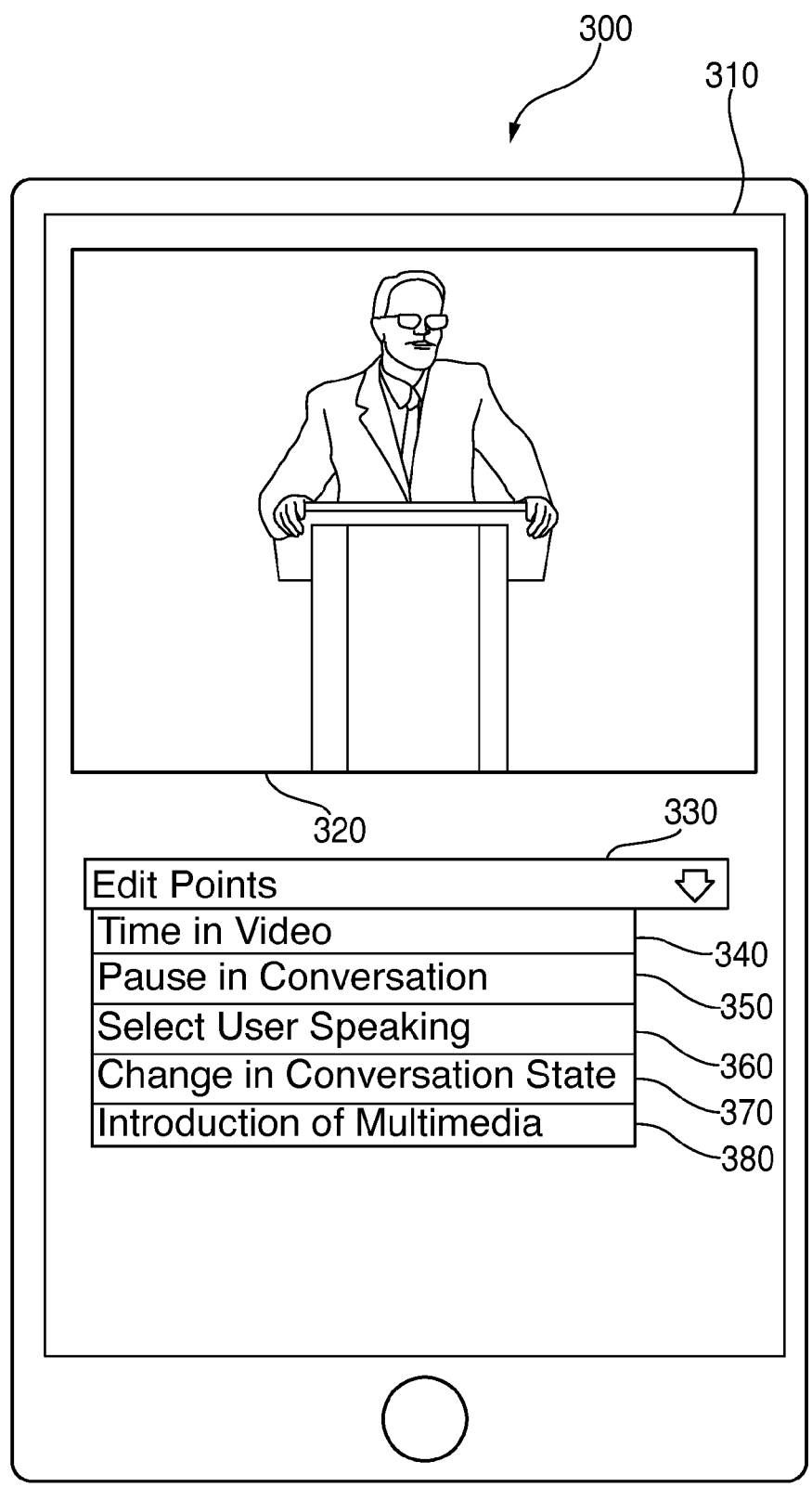
FIG. 3 is an illustrative diagram of an exemplary user interface displayed on a user device showing a list of suggested edit points in accordance with various embodiments.

FIG. 3 is an illustrative diagram of an exemplary user interface displayed on a user device showing a list of suggested edit points in accordance with various embodiments. User device 300, in some embodiments, may correspond to any user device or system, such as user devices 121-124 and/or server 110.

I/O interface 121d and 121e may present user interface 310 may include any suitable mechanism and/or component for receiving inputs from a user operating user device 300. In some embodiments, user interface 310 may operate through the use of a touch screen and/or an interactive touch sensitive display screen. For example, user interface 310 may operate through the use of a multi-touch panel and may include one or more capacitive sensing panels.

Video display section 320 may present a recorded online event displayed on user interface 310 of user device 300. Persons of ordinary skill in the art will recognize that any form of media or medium may be presented within video display section 320. For example, the recorded online event, any other movie, video, or continuous image stream, or any image may be presented within video display section 320 on user interface 310.

Edit point list 330, in one embodiment, may be provided by the video editing tool. For example, the video editing tool may store past types of edit points used by the user, and present those past options as suggested edit points for edit point list 330 to be used. Edit point list 330, in one embodiment, may be displayed on user interface 310 of user device 300 and may be in presented as a drop down menu. For example, a user may select edit points from edit point list 330 on user interface 310 by touching user interface 310 of user device 300 with their finger or a stylus. In response to detecting that the user has contacted user interface 310, user device 300 may relay instructions to processor 121c to cause various types of edit points (e.g., edit points 340-330) to be displayed on user interface 310.

In one embodiment, the suggested edit points within edit point list 330 may include, but are not limited to, time in video 340, pause in conversation 350, select user speaking 360, change in the conversation state 370, and introduction of multimedia 380. These suggested edit points may be scrolled through on user interface 310 by the user. Although only five (5) suggested edit points 340-380 are displayed within edit point list 330, persons of ordinary skill in the art will recognize that more or fewer edit points may be included, and in some embodiments a user may be capable of adding a new or different type of edit point to edit point list 330 and/or modifying or customizing a current type of edit point.

Once a user selects an edit point, that edit point may, in some embodiments, have its displayed format change or be modified. For example, a selected edit point may light up, become shaded, greyed out, or become enlarged in order to alert the user that a specific suggested edit point has been selected. After a suggested edit point has been selected, the user may, in some embodiments, add information to the suggested edit point. For example, if the user would like a flag to be inserted at time 3:30 of the recorded online event, the user may select the edit point "Time In Video" 340 from edit point list 330. In response to this selection being made, the user may then input time 3:30 as the time that a flag should be created within the recorded online event.

If an incorrect edit point is selected, in some embodiments, the user may be able to go back to the original drop down menu selection, edit point list 330, by selecting a "go back" button. Persons of ordinary skill in the art will recognize that the aforementioned edit points are merely exemplary.

In some embodiments, edit point 340, "Time In Video," may allow a user to select edit points at various times within the recorded video. For example, if a user is trying to set a start point for a video, the user may select a time in the recorded video as an edit point, and may designate this as a start time. As another example, a user may set a second time within the recorded video as another edit point, which may be designated as an end time. This may be useful in a situation where the user has forgotten to record an online event or video. In this particular situation, a server may be backing up the entire online event, and the user may select a first edit point 340, corresponding to a start time, as well as a second edit point 340 corresponding to an end time for the recorded video. To select the suggested edit point 340, in one embodiment, the user may first select the drop down menu of suggested edit points from edit point list 330, including various suggested edit points (e.g., edit points 340-380). The user may then select edit point 340, "Time In Video" by touching the "Time In Video" edit point 340 displayed on user interface 310. After the selection is made, the user may then be prompted to select a specific time in the online event that the user wishes the video editing tool to flag as a start or end time. For example, if the user knows the start time of the online event should be 3:15 PM, the user may select the time 3:15 PM to be an edit point and then select that edit point to be a start time. This may enable a user to have a specifically timed video recording, even in situations that the user did not start recording from the beginning. This may be particularly useful if a user has forgotten to record an event or video, and only remembered to record after the event has already begin. Thus, a user may be able to "go back" and select what time the event should have begun recording, and obtain a recording beginning at the appropriate start time.

In some embodiments, if an online event has a lengthy introduction and the user knows the introduction lasts a certain amount of time, the user may select edit point 340 to select a new start time such that the recording does not include the lengthy introduction. The user may, for example, be prompted to put select an edit point 340 to correspond to a specific start time for the recorded online event. After the user makes this edit point selection, the video editing tool may flag that selected time as an edit point by the user, and, because the user has signified that this edit point will be a start time, the video editing tool may have the new recording begin at this time. This may allow the user to simply skip a lengthy introduction when reviewing the online event, as opposed to having to fast forward or view the entire length introduction in order to get to the desired portion of the online event.

In some embodiments, edit point list 330 may also include edit point 350, "Pause In Conversation." "Pause In Conversation" edit point 350 may be an option for a user that allows edit points to be selected that correspond to a pause in a conversation within the recorded online event. For example, if the user would like to only hear and see parts of the video where users are speaking, the user may select "Pause In Conversation" edit point 350. To select edit point 350, in one embodiment the user may first select, from the drop down menu associated with edit point list 330, "Pause In Conversation" edit point 350. After selecting edit point 350, the video editing tool may flag each pause in the conversation. This may be accomplished by the video editing tool using visual and audio recognition software, as described above. Once, the video editing tool has recognized each pause in the conversation, as mentioned above in step 240 of FIG. 2, the video editing tool may alter the recorded online event file and place an indicator code and/or a time stamp at each recognized occurrence of the user selected edit point. The video editing tool modifies the file itself, transforming the recorded online event into a flagged, usable, and editable video for the user. These flags allow the user to skip through pauses in conversations, allowing a user to move from conversation to conversation within the online event.

In some embodiments, edit point listing 330 may also include a "Select User Speaking" edit point 360, which may allow a user to flag when a specific user speaks within the recorded video. For example, if the user is interested in what the moderator of an online event says, the user may select edit point 360, at which point the user may be prompted to select, or input, a specific individual or user accessing the online event to be monitored. For example, the video editing tool may have a list of participants of the online event stored in memory based on each participants' log-in credentials. The user may then be prompted to select a specific participant, or participants, from the list of participants to be monitored or to have that participant(s) speech analyzed. If a particular participant, however, is not included in the list of participants, an add a participant option may also be provided. After a selection of a participant, or participants, is made, the video editing tool may flag each time the select user is speaking. This may be accomplished by the video editing tool using visual and audio recognition software, as described above. Once, the video editing tool has recognized each time the user selected edit point occurs, as mentioned above in step 240 of FIG. 2, the video editing tool may alter the recorded online event file and place an indicator code and/or a time stamp at each recognized occurrence of the user selected edit point. The video editing tool modifies the file itself, transforming the recorded online event into a flagged, usable, and editable video for the user. This may allow the user to skip through the video to specific points where the select user is speaking.

In some embodiments, edit point list 330 may also include a "Change In Conversation State" edit point 370, which may allow a user to flag when a change in conversation state occurs. A conversation state, as described herein, may describe different conversation settings within an online event, changes in inflection of a user's speech, change in a density of voices or speech patterns determined to be within the online event, change in an amount of participants conversing, or any other conversation attribute that may change or become modified within the online event, or any combination thereof. In some embodiments, participants may access an online event using various multiple modes of conversation based on a variety of attributes (e.g., available bandwidth, context, activity, etc.). For example, some exemplary modes may include an active mode, an intermediate mode, and a ready-on mode.

In some embodiments, edit point list 330 may also include "Introduction Of Multimedia" edit point 380, which may allow a user to flag when multimedia is being introduced into or within the recorded video and/or online event. Multimedia, as described herein, may refer to a presentation, a video, an audio track or any other variety of artistic or communicative media and is not meant to be limited to the aforementioned examples. In response to selecting edit point 380, the user may be prompted by the video editing tool to select or input a type of multimedia that the user may be looking for, or may want to flag when it is being introduced. For example, if the user wants to see all video presentations during an online event, when prompted, the user may select video presentations for edit point 380. This may allow the user to flag each time the select multimedia was introduced, displayed, and/or discussed within the recorded video. This allows a user to find certain parts of the video that include multimedia.

Figure 4:
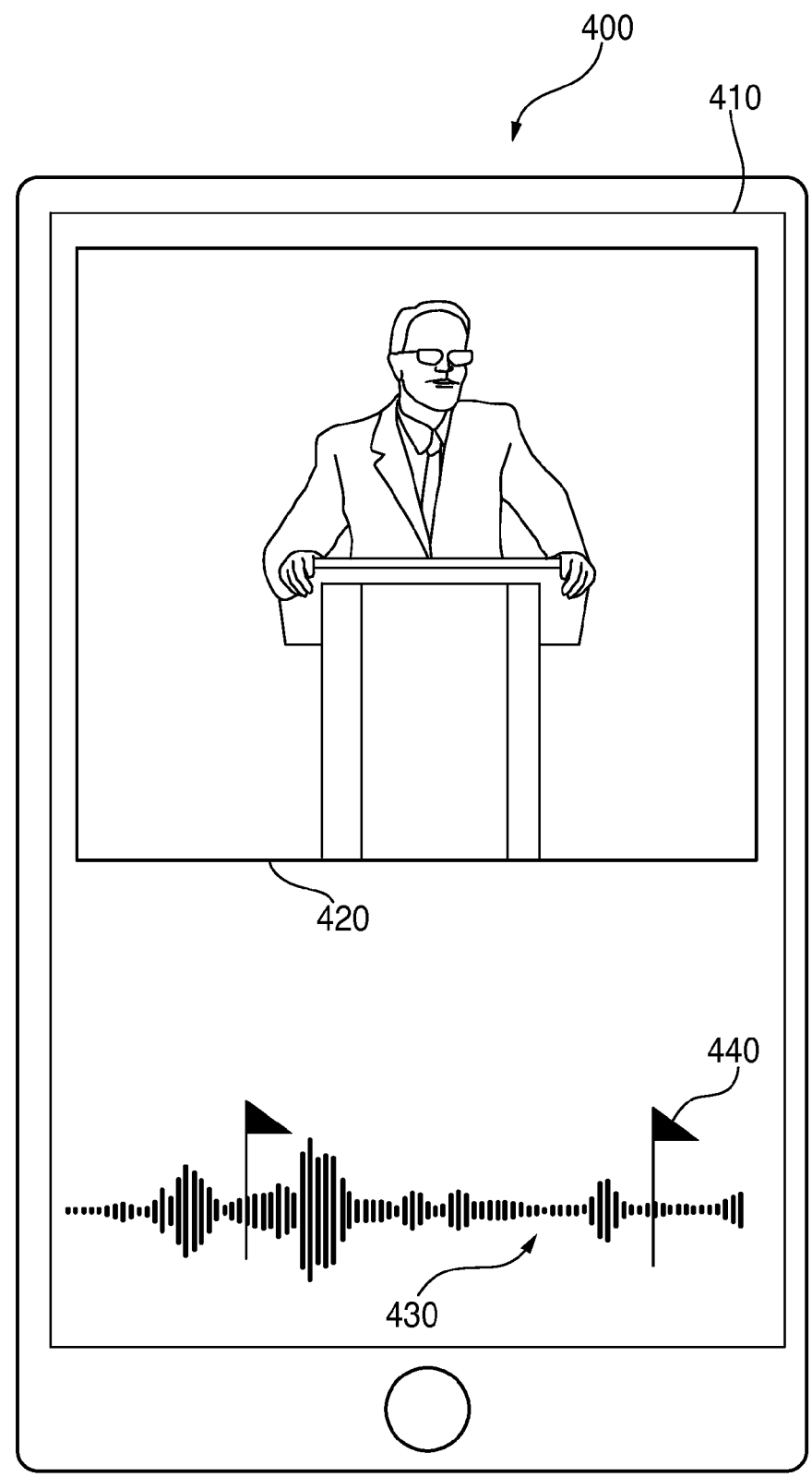
FIG. 4 is an illustrative diagram of an exemplary user interface displaying a recorded video in which user selected edit points have been flagged in accordance with various embodiments.

FIG. 4 is an illustrative diagram of an exemplary user interface displaying a recorded video in which user selected edit points have been flagged in accordance with various embodiments. User device 400, in some embodiments, may correspond to any user device or system (e.g., user devices 121-124 and/or server 110). In some embodiments, user device 400 may be substantially similar to user device 300 of FIG. 3, and the previous description may apply.

I/O interface 121*d* and 121*e* may display user interface 410 thereon. In some embodiments, user interface 410 may operate through the use of a touch screen and/or an interactive touch sensitive display screen. For example, user interface 410 may operate through the use of a multi-touch panel and may include one or more capacitive sensing panels.

Presented video 420 is displayed on user interface 410 of user device 400. Presented video 420 in some embodiments may be similar to recorded online event 320 in FIG. 3, however, in addition to the recorded online event, the presented video 420 has selected user edit points flagged. Presented video 420 in some embodiments may show a flagged recorded online event. Various types of online events include, but not limited to, online classes, online chat forums, conferences, presentations, lectures, meetings, concerts, and personalized gatherings.

Video display section 420, which may be substantially similar to video display section 320 of FIG. 3, may presented video, such as a recorded video or video of an online event, for example. User interface 410 may also present waveform 430. Waveform 430 may highlight to the user various sections of an audio track associated with the video displayed within video display section 420, and corresponding audio intensity level for those sections. For example, sections corresponding to one participant speaking may a greater audio intensity value than sections corresponding to a single participant speaking. Waveform 430 may, additionally or alternatively, represent some or all of the recorded video depending on a duration of the recorded video and/or an availability to be displayed on the user device. For example, a short video's audio waveform may be able to be displayed on a display screen of user device 400, whereas only a portion of a large video's audio waveform may be able to be displayed on user device 400. When the video is presented, as seen in FIG. 4, waveform 430 is one of many ways that elapsed time for the presented video 420 may be represented. User device 400 may also display a time elapsed bar, or any other suitable way to show time in presented video 420.

After the video editor has located and flagged the various edit points, in some embodiments, the video editor may create visual representations 440 of the flags for the edit point on waveform 430. This may allow the user to visual when and where the edit points occur within the video. The user may use visual representations 440 of the flags to select different video section to jump to, or to move from one video portion of the video to another, allowing the user to skip, if they so desire, one or more edit points. For example, if the user selected "Pause In Conversation" edit point 350, the video editing tool may flag any determined region of waveform 430 corresponding to a pause in conversations within the recorded video. For example, as seen in waveform 430, visual representations 440 of the flagged edit points may be positioned at times where the sound is less intense than at other sections of waveform 430 where the audio intensity is large.

To view a specific video portion, a user may simply select a visual representation 440 of an edit point flag, and the user may be presented with audio and/or video corresponding to that video portion. Furthermore, a user may move to a different or other video portions by selecting a different visual representation 440 of a flag displayed within waveform 430 it. This may cause a certain video portion to be displayed within video display section 420 and/or to start playing the video portion within video display section 420 corresponding to a particular visual representation 440 of an edit point flag.

Figure 5:
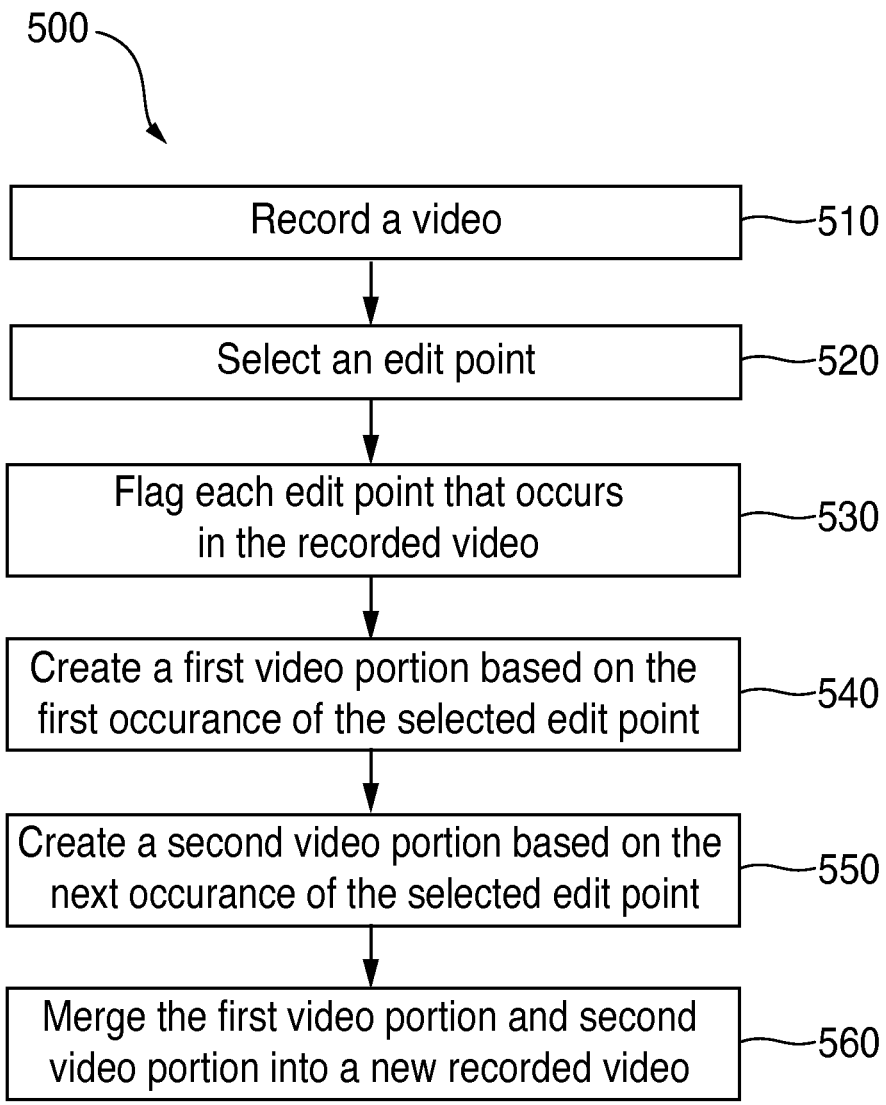
FIG. 5 is an illustrative flowchart of a process for creating a customized video in accordance with various embodiments.

FIG. 5 is an illustrative flowchart of a process for creating a customized video in accordance with various embodiments. Process 500, in one exemplary embodiment, uses a video editing tool to transform recorded video and audio data into a customized video using video portions based on user selected edit points. Process 500 may, in some embodiments, begin at step 510. At step 510, video from a source is recorded using a video editing tool. This source may be, in some embodiments, storage on a server, memory on a user device, or the video editing tool. In some embodiments, step 510 of FIG. 5 is substantially similar to step 210 of FIG. 2, and the previous description may apply.

At step 520 a user may make a selection of at least one type of edit point using a video editing tool. For example, a user recording a football game may want to only record or view recorded portions of when the quarterbacks throws the football. In this particular example, the user may select "pass" or "football throw" as a type of an edit point. While this embodiment may allow a user to make any selection of an edit point t, in some embodiments, a user may select from a suggested list of edit points, such as edit point list 330 of FIG. 3. Various types of edit points may include, but are not limited to, an amount of time in the video, a specific sound, a type of action, and an introduction of multimedia. For example, if a user wants to only hear and see replays that are played during a football game, the user may select an introduction of multimedia as the user selected edit point, where the multimedia that will be flagged is each occurrence of a replay within the recorded video of the football game.

While only one edit point is selected by the user, in some embodiments a user may be able to select multiple edit points. For example, continuing with the football illustration mentioned previously, if the user wants to see each occurrence of a kickoff and a passing play, a user may select two edit points, such as "kick" and "pass." A user may also select two edit points that are associated with one another. These associated edit points may allow a user to select a start edit point and an end edit point. This gives a user more autonomy when creating video portions. For example, if a user wants to make sure they see the entirety of each play, the user can select a start edit point and an end edit point for each play. As one illustrative example, when a whistle is blown or it is determined that the word "hike" is said within the video, an edit point corresponding to a start of the video portion may be set, and then when another whistle is blown signaling the play is over is determined to occur within the video, an edit point corresponding to an end of the play may be set. However, in some embodiments, At step 530, the video editing tool may flag each time that an edit point occurs within the recorded video. In this step, the video editing tool will alter the recorded video file and place an indicator code and/or a time stamp at each recognized occurrence of the user selected edit point. Step 530 alters the file itself, transforming the recorded video into a flagged video, ready to be customized. Continuing the above example of user selecting "pass" as the selected edit point, the video editing tool may then determine the time in the recorded video when each pass play occurs in the recorded video. In order to capture the entire "pass," the video editing tool may flag the moment where the pass play begins and continue until the pass play ends. The video editing tool may accomplish this by using both audio and video data. For example, when the announcers say or use words relating to pass plays, the video editing tool may record a time corresponding to when this occurs within the video. As another example, when images relating to passing the football are displayed within the recorded video, the video editing tool may a time when the images are displayed. For example, when the quarterback throws the football, the video editing tool may record a time when the quarterback begins to throw the football. The video editing tool may continue to flag the occurrence of the edit point until the video editing tool recognizes that the event for a particular edit point is finished. In order to accomplish analyzing the audio data, the video editing tool may recognize speech and/or images in any number of ways. For example, various speech and/or image recognizing techniques are described in greater detail above with reference to FIGS. 2 and 3. However, a person of ordinary skill in the art will recognize that the video editing tool may recognize visual and audio data in any number of ways. Furthermore, a person of ordinary skill in the art will recognize that the aforementioned techniques of audio and visual recognition are merely exemplary.

At step 540, the video editing tool may create a first video portion from the recorded video. The video editing tool may record the first video portion by recording a first occurrence of the user selected edit point. Continuing previous example, the video editing tool may make a first video portion showing a quarterback throwing the football for the first time. In some embodiments, the video editing tool may have the entire passing play be recorded based on the selected edit point. For example, the edit point may correspond to a request to capture the entire passing play. If the user would like to make a specific selection and use associated edit points, the user may select, as a first edit point, the word "hike," for example, and the second edit point may be set as the sound of a whistle (such as a whistle blown by a referee signifying a play ending). In this scenario, the first video portion may start when the quarterback begins to pass the football, and end with the whistle. In some embodiments, a delay or latency may be built into the starting/end points such that a certain amount of additional recording may be used prior to the starting point and after the edit point. For example, a three second buffer may be used at the front and back end of the first video portion to capture the three seconds leading up to the quarterback passing the football, and the three seconds after the referee blows their whistle signifying the play has ended.

In some embodiments, the first video portion that is created may be stored locally on the user device. For example, user device 400 may store the recorded video in memory 121b resident on user device 400. In some embodiments, however, the created first video portion may be stored on an external device, such as server 110, which may host the event that is being recorded. However, persons of ordinary skill in the art will recognize that the first video portion may be stored in any suitable location, and the aforementioned is merely exemplary.

At step 550, the video editing tool may create a second video portion. The video editing tool may record the second video portion by recording a next occurrence of the user selected edit point. Continuing previous example, the video editing tool may make a second video portion showing the quarterback throwing the football for a second time. Similar to the first video portion, the second video portion may start with the quarterback passing the football a second time and may end with the next occurrence of the whistle sounding.

If a video is very long, or the edit point selected by the user frequently occurs within the recorded video, process 500 may repeat step 550. For example, after step 550 a step may be included which query the video editing tool to determine whether there are any more occurrences of the user selected edit points. If yes, step 550 may be repeated. If not, then process 500 may proceed to step 560. Continuing the aforementioned example, if there are more than two passing plays in a football game, the video editing tool may create more than two video portions. If there are 50 occurrences of the edit point, "pass," then the video editing tool may create 50 video portions. This would give the user a complete experience showing each recognized occurrence of the selected edit points.

At step 560, the video editing tool may merge the first video portion and the second video portion into a new video. Merging, as used herein, is not limited to taking both the video portions and presenting them in an interwoven manner. Merging may correspond to combining, splicing, aggregating, and/or dividing the various video portions created. In some embodiments, the video editing tool may merge the first and second video portions in chronological order. To avoid discontinuities between the two merged video portions, the video editing tool may use a transition for transitioning from the first video portion to the second video portion. A transition, as used herein, may include, but is not limited to, adding phasing in and out effects, adding audio, adding a pause, inserting in text or multimedia into the merged video, and/or changing the length of the previously created video portions. For example, if there are two passing plays that are going to be merged, after over the first video portion ends, the video editing tool may slowly darken the or phase-out the video from the first video portion and slowly transition in the second video portion.

The video editing tool may also create a transition image. This transition image may be placed in between merged video portions. The transition image may have a title stating the type, time, or any other relevant information for a specific edit point or video portion, and that video portion may then follow. For example, if the customized video had two video portions and the edit point was "passing play," the transition image between the first and second video portions' title may be "Passing Play, Video Portion 2." This transition image may, in some embodiments, be placed before the first video portion in the combined video. While step 560 describes two videos being merged together, persons of ordinary skill in the art will recognize that any number of video portions may be merged together.

Figure 6:
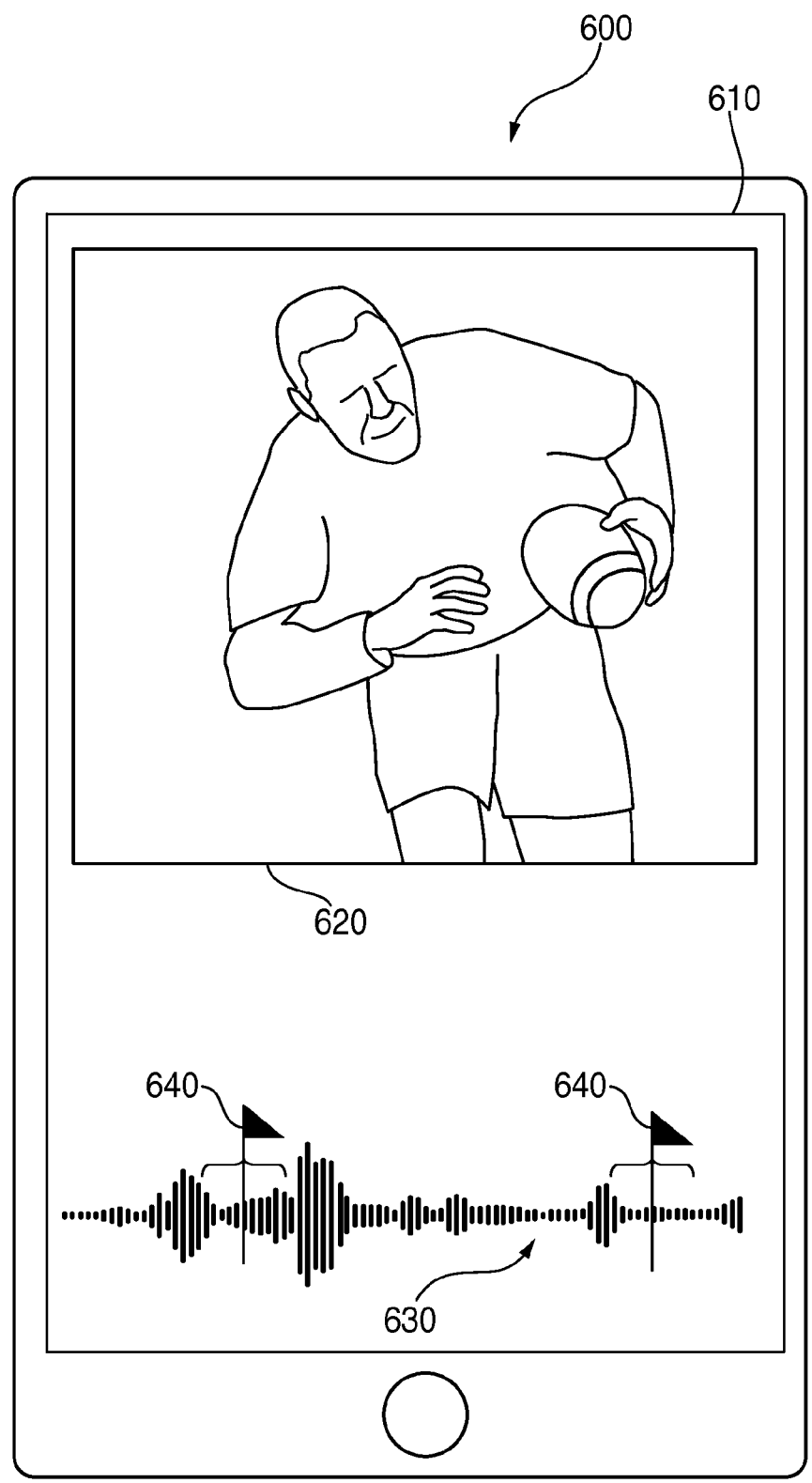
FIG. 6 is an illustrative diagram of an exemplary user interface displaying a recorded video including visual representations of flags corresponding to user selected edit points in accordance with various embodiments.

FIG. 6 is an illustrative diagram of an exemplary user interface displaying a recorded video including visual representations of flags corresponding to user selected edit points in accordance with various embodiments. In some embodiments, user device 600 of FIG. 6 may be substantially similar to user device 400 of FIG. 4, and the previous description may apply, User device 600 may include an I/O interface 121*d* and 121*e*, which may display user interface 610 thereon. In some embodiments, user interface 610 may be substantially similar to user interface 410, and the previous description may apply.

Video display section 620 may present a recorded video, which may be displayed on user interface 610 of user device 600. The video presented within video display section 620, in some embodiments, may be substantially similar to the video presented within video display section 420 of FIG. 4, and the previous description may apply. In one embodiment, the presented video with video display section 620 may show a customized video in which at least two video portions are merged.

The recorded video presented within video display section 620 may, in some embodiments, be represented by waveform 630, which also may be presented within user interface 610. Waveform 630 may correspond to a portion or all of corresponding audio for the recorded video presented within video display section 620, however waveform 630 may also correspond to a waveform representation of the video intensity signal of the presented video. Waveform 630 may highlight various sections of audio track for the presented video, or may corresponding to audio intensity levels for various sections of the presented video. For example, sections corresponding to one user speaking may be louder than sections corresponding to no user speaking. Waveform 630 may represent a portion or the entirety of the recorded video depending on length of the recorded video and the storage and/or display capacity of the user device.

Figure 7:
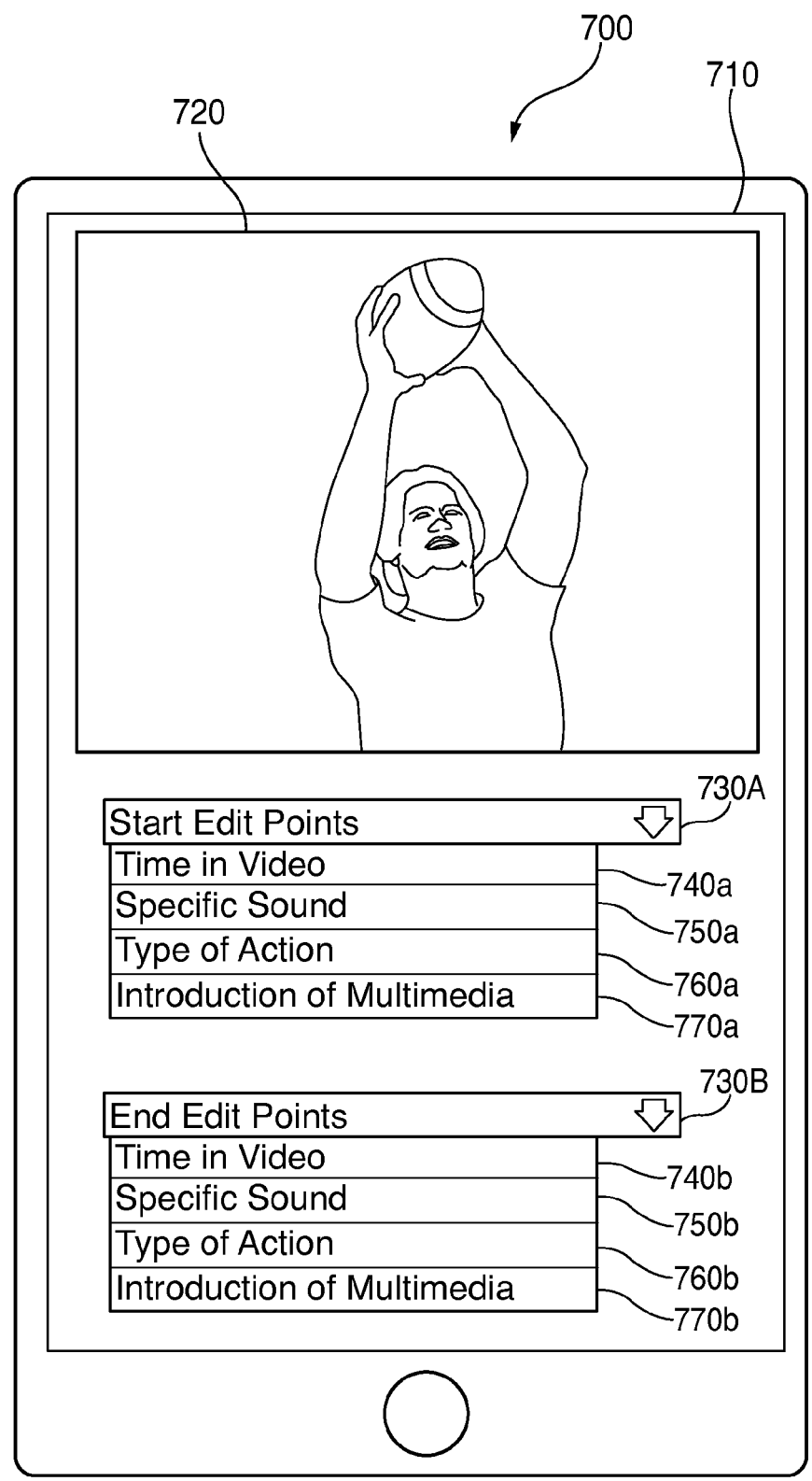
FIG. 7 is an illustrative diagram of an exemplary user interface displayed on a device including a list of edit points in accordance with various embodiments.

Once the video editor has located and flagged user selected edit points, in some embodiments, the video editor can show the flags 640 on waveform 630. This allows the user to see when and where the user's selected edit points occur in the video. The flags will allow the user to see when the video portions associated with the user selected edit points occur in the recorded video 620. Because the user selected edit points are used to make video portions, flags 640 show a portion of elapsed time. This allows the user to see where FIG. 7 is an illustrative diagram of another exemplary user interface displayed on a user device including various edit points in accordance with various embodiments. User device 700, in some embodiments, may be substantially similar to user device 600 of FIG. 6 and the previous description may apply. I/O interface 121*d* and 121*e* may display user interface 710 thereon, which in some embodiments may be substantially similar to user interface 610, and the previous description may apply. User interface 710 may include video display section 720, which may present a recorded video thereon. The recorded video presented within video display section 720 may also be substantially similar to the recorded video presented within video display section 320 of FIG. 3, and the previous description may apply.

User interface 710 may also present edit point lists 730A and 730B, in one embodiment, which may be suggested by the video editing tool. For example, as mentioned previously, the video editing tool may store one or more previously used edit point types, and therefore may present these edit points within edit point lists 730A and 730B. In some embodiments, edit point list 730A may correspond to a list of various types of edit point that may be used, or designated, as "Start" edit points, whereas edit point list 730B may correspond to a list of various types of edit points that may be used, or designated, as "End" edit points. In some embodiments, edit points lists 730A and 730B may be substantially similar to one another, or may include different edit points, and persons of ordinary skill in the art will recognize that edit point lists 730A and 730B may be customized in accordance with a user's preferences. The edit points presented within each edit points list 730A and 730B may, in some embodiments, include a scrolling option so that a user may be able to view additional types of edit points not displayed on user interface 710.

In some embodiments, a user may select a starting edit point from edit point list 730A. For example, a user may select edit point list 730A on user interface 710, which in some embodiments may be a drop down menu labelled "Start Edit Points," and some or all of the various types of edit points that may be used or selected for a start edit point. Referring to the example described in relation to FIG. 3, if the user would like a flag to be inserted at time 3:30 of the recorded online event, the user may select the edit point "Time In Video" 740*a* from edit point list 730A. In response to this selection being made, the user may then input time 3:30 as the time that a flag should be created within the recorded online event. After a user has selected a start edit point, the user may then select an end point using a similar process with the exception that the user may select a type of end edit point (e.g., edit points 740b-770b) from edit point list 730B.

In some embodiments, the various types of edit points included within edit points lists 730A and 730B may include a "Time In Video" edit point 740a and 740b, a "Specific Sound" edit point 750a and 750b, a "Type of Action" edit point 760a and 760b, and/or an "Introduction of Multimedia" edit point 770a and 770b. However, persons of ordinary skill in the art will recognize that any additional edit points may be used, or any of the aforementioned edit points may not be included, and the aforementioned are merely exemplary. In some embodiments, edit points lists 730A and 730B may be substantially similar to edit point list 330 of FIG. 3 and the previous description may apply.

Figure 8:
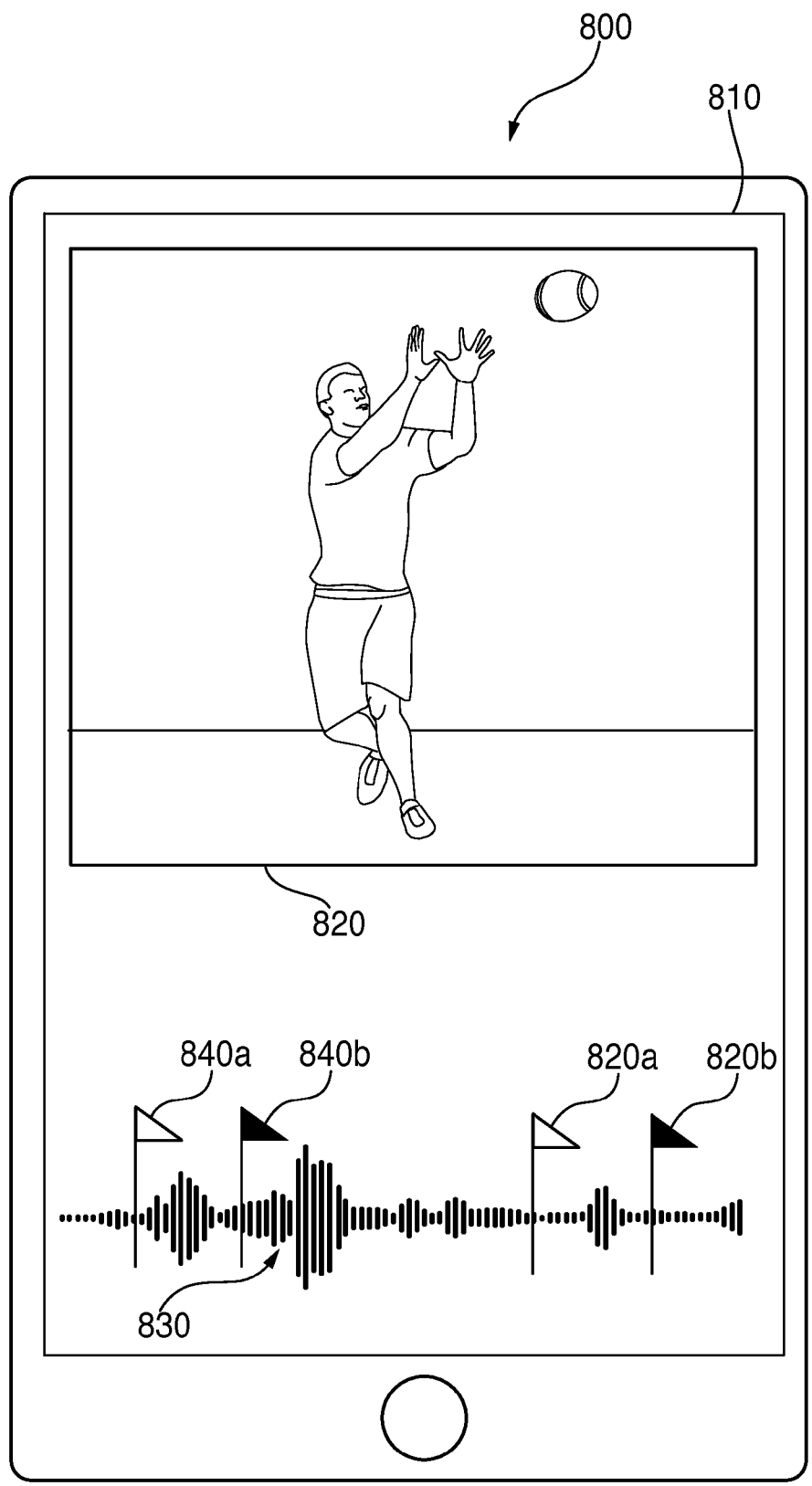
FIG. 8 is an illustrative diagram of an exemplary user interface presented a recorded video including visual representations of flagged user selected edit points in accordance with various embodiments.

FIG. 8 is an illustrative diagram of an exemplary user interface presented a recorded video including visual representations of flagged user selected edit points in accordance with various embodiments. User device 800, user interface 810, and video display section 820, in some embodiments, may be substantially similar to user device 600, user interface 610, and video display section 620 of FIG. 6, and the previous description may apply.

The recorded video displayed within video display section 820 may be represented by waveform 830, which may be substantially similar to waveform 730 of FIG. 7. After the video editing tool has located and flagged user selected edit points, in some embodiments, the video editor may create visual representations 840a, 840b of the flagged edit points on waveform 830. For example, visual representation 840a may correspond to a flagged start edit point, whereas visual representation 840b may correspond to a flagged end edit point. In an embodiment, as seen in FIG. 8, the first video portion would start at the first occurrence of the user selected start edit point and end at the first occurrence of the user selected end edit point. The second video portion would start at the second occurrence of the user selected start edit point and end at the second occurrence of the user selected end edit point. This allows the user to see when and where the user's selected edit points occur in the video. It also allows the user to see where the video portions will be coming from. The user selected start and end edit points allow a user to have more creative control over the video portions.

Figure 9:
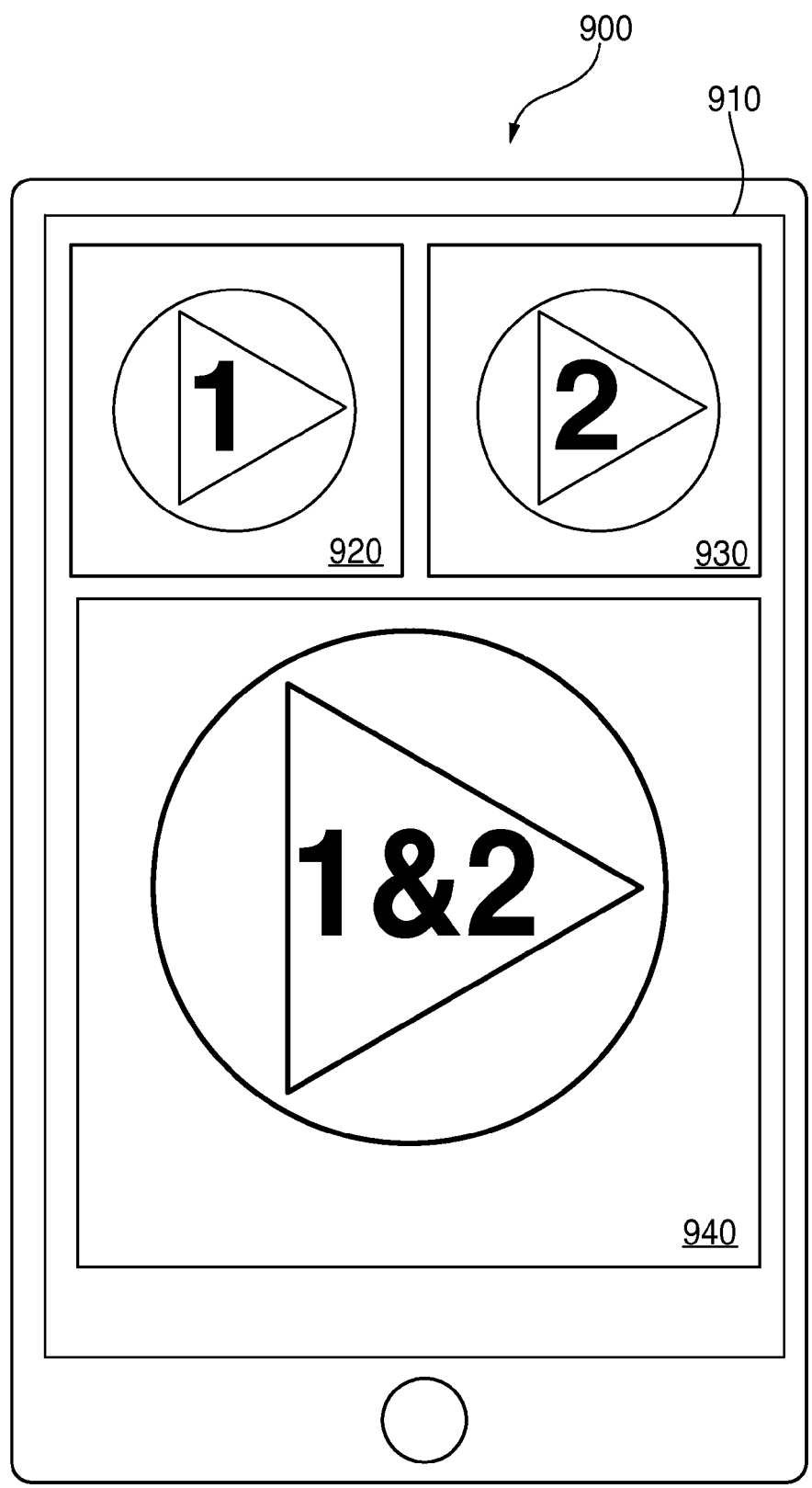
FIG. 9 is an illustrative diagram of an exemplary user interfaced displayed on a device including a preview for a created video including video portions formed from selected edit points in accordance with various embodiments.

FIG. 9 is an illustrative diagram of another exemplary user interface displayed on a user device in accordance with various embodiments. User device 900, in some embodiments may be substantially similar to user device 800 of FIG. 8, and the previous description may apply.

User interface 910 may, in some embodiments be substantially similar to user interface 810 of FIG. 8, with the exception that the former may include various video portions and a section to merge or display a merged video created from the various video portions. User interface 910, in some embodiments may display the first video portion 920. This first video portion may be displayed in any number of ways, including, but not limited to, an HD video, a thumbnail, or a representative image. As described in process 500, in some embodiments, the first video portion 920 is created by the video editing tool by recording the first occurrence of the user selected edit point. For example, if a user has a recorded concert and wants to hear guitar solos, the user can select guitar solo as the selected edit point. In this example, the first video portion would be the first recognized guitar solo.

The first video portion 920, in some embodiments, may also be created by the video editing tool by recording from the first occurrence of a user selected start edit point to the first occurrence of a user selected end edit point. For example, if a user has a recorded awards ceremony, and only wants to hear the host of the ceremony talk, the user can select the start edit point as when the host is introduced, and the end edit point as when the host introduces another speaker. In this example, the first video portion 920 would be the first time the host speaks in the award ceremony.

User interface 910, in some embodiments may display the second video portion 930. This second video portion may be displayed in any number of ways, including, but not limited to, an HD video, a thumbnail, or a representative image. In some embodiments, the second video portion 930 is displayed in a similar manner as the first video portion 920. Persons of ordinary skill in the art will recognize that although only two video portions 920 and 930 are presented within user interface 910, any number of video portions may be included, and the aforementioned is merely exemplary.

As described in process 500, in some embodiments, the second video portion 930 is created by the video editing tool by recording the next occurrence of the user selected edit point. Continuing the above example, if a user has a recorded concert and wants to hear guitar solos, the user can select guitar solo as the selected edit point. In this example, the next video portion would be the next recognized guitar solo.

The second video portion 930, in some embodiments, may also be created by the video editing tool by recording from the next occurrence of a user selected start edit point to the next occurrence of a user selected end edit point. For example, if a user has a recorded awards ceremony, and only wants to hear the host of the ceremony talk, the user can select the start edit point as when the host is introduced, and the end edit point as when the host introduces another speaker. In this example, the second video portion 930 would be the next time the host speaks in the award ceremony.

After the video editing tool has created the first video portion 920 and the second video portion 930 the video editing tool merges the first video portion 920 and the second video portion 930 into a new video. In some embodiments, the video may be previewed to the user. This preview can be displayed to the user on user interface 910 as previewed video 940. The previewed video 940 may be displayed in any number of ways, including, but not limited to, an HD video, a thumbnail, or a representative image. In some embodiments, the previewed video 940 is displayed in a similar manner as the first video portion 920 or the second video portion 930. This preview may allow the user to accept or reject the new video.

This preview may also allow the user to select the order in which the first video portion 920 and the second video portion 930 are played in the new video. To determine the order of the video portions, the user may press and hold a video portion and swipe it in a direction. For example, if the user wants to have second video portion 930 play before first video portion 920, the user would may first press and hold the second video portion 930. While pressing the second video portion 930, the user may swipe the video from right to left placing it before the first video portion 920. Once the user has swiped the second video portion 930 past the first video portion 920, the user may then release. The video editing tool would then alter the previewed video in a way that plays the second video portion 930 first. This may be done automatically upon completion of the swipe, or the video editing tool may have a "create video" button. If the video editing tool had a "create video" button, the user would make their changes and, when finished, press the "create video" button. The user may also alter the order of the videos by swiping the first video portion 920 in the same manner as described above, however, the user in this example would swipe the first video portion 920 from left to right past the second video portion 930.

The user may also delete video portions that the user does not want in the new video. This can be done any number of ways. For example, the user may press and hold a video portion and swipe it in an upward direction. While all of the above swiping mechanisms have been described, they are only described for exemplary purposes and are not meant to be limiting in any way.

In some embodiments, there may be more than two video portions. If this is the case, the user may scroll through the multiple video portions. The user may also make changes to the video portions. For example, a user may change the order of the video portions or delete video portions. As mentioned above, once the user has completed their changes, the video editing tool may then alter the previewed video in a way that plays the second video portion 930 first. This may be done automatically upon completion of the changes, or after a user presses a "create video" button.

Once the previewed video 940 is acceptable to the user, the user may accept this video. Once the user has accepted the previewed video 940, the new video is completed for the user. In some embodiments, one or more options to share or save the new video may be provided to the user. For example, an option to email the new video to one or more contacts, or to upload the new video to one or more social media networks may be provided for to the user within user interface 910. As another example, the user may capable of saving or storing the new video to user device 900 and/or to a server, such as server 110 of FIG. 1, which may have hosted the original event used to create the various video portions (e.g., video portions 920 and 930).

The various embodiments described herein may be implemented using a variety of means including, but not limited to, software, hardware, and/or a combination of software and hardware. The embodiments may also be embodied as computer readable code on a computer readable medium. The computer readable medium may be any data storage device that is capable of storing data that can be read by a computer system. Various types of computer readable media include, but are not limited to, read-only memory, random-access memory, CD-ROMs, DVDs, magnetic tape, or optical data storage devices, or any other type of medium, or any combination thereof. The computer readable medium may be distributed over network-coupled computer systems. Furthermore, the above described embodiments are presented for the purposes of illustration are not to be construed as limitations.

What is claimed is:

1. A method for customizing a recorded online event, comprising:
   receiving, at a user device, a selection of at least one edit point;
   determining, in response to receiving the selection, each occurrence of the at least one edit point within the recorded online event;
   flagging, in response to determining, each occurrence of the at least one edit point;
   generating a flagged online event comprising the recorded online event and each of the at least one edit point that has been flagged; and
   presenting the flagged online event, wherein receiving, determining, flagging, and generating allows a user to easily playback flagged portions of the recorded online event on the user device.

2. The method of claim 1, wherein the at least one edit point is selected from a list of suggested types of edit points.

3. The method of claim 2, wherein the types of edit points of the list of suggested types of edit points comprises:
   a particular time in the recorded online event;
   a pause in a conversation;
   a select user speaking;
   a change in a conversation state; and
   an introduction of multimedia.

4. The method of claim 1, further comprising:
   publishing the flagged online event using the user device.

5. The method of claim 4, wherein the user device publishes the flagged online event using a social media application.

6. The method of claim 1, wherein presenting the flagged online event further comprises;
   previewing the flagged online event using the user device;
   prompting a user to accept the preview of the flagged online event; and
   presenting the user accepted flagged online event to the user using the user device.

7. The method of claim 1, further comprising: sending the flagged online event to a plurality of users accessing the recorded online event.

8. The method of claim 7, wherein sending the flagged online event comprises:
   previewing the presented online event to the user of the user device;
   prompting the user to accept the preview of the presented online event; and
   sending the accepted preview of the presented online event to a plurality of users who accessed the recorded online event.

9. The method of claim 1, wherein the at least one edit point comprises a plurality of edit points.

10. A method for creating customized video, comprising:
    receiving, at a user device, a selection of at least one edit point;
    determining, in response to receiving the selection, each occurrence of the at least one edit point within the recorded online event;
    flagging, in response to determining, each occurrence of the at least one edit point;
    creating a first video portion based on a first flagged occurrence of the at least one edit point;
    creating a second video portion based on a second flagged occurrence of the at least one edit point; and
    creating a new video wherein the new video comprises:
      the created first video portion; and
      the created second video portion.

11. The method of claim 10, wherein the creating a second video portion occurs until there is a created video portion based on each flagged occurrence of the selected edit point.

12. The method of claim 11 wherein the new video further comprises:
    all created video portions based on a flagged occurrence of the selected edit point.

13. The method of claim 10, wherein the at least one selected edit point comprises a plurality of edit points.

14. The method of claim 10, wherein the recorded video comprises visual data and audio data.

15. The method of claim 10, wherein:
the at least one selected edit point comprises a start edit point and an end edit point;
the first flagged occurrence of the selected edit point comprises:
   a first flagged occurrence of the selected start edit point; and
   a first flagged occurrence of the selected end edit point; and
the second flagged occurrence of the selected edit point comprises:
   a second flagged occurrence of the selected start edit point; and
   a second flagged occurrence of the selected end edit point.

16. The method of claim 10, wherein creating the new video further comprises:
previewing the first video portion and the second video portion to the user;
receiving a selection of acceptable video portions from the user;
the new video comprises the first video portion if the acceptable video portions comprise the first video portion; and
the new video comprises the second video portion if the acceptable video portions comprises the second video portion.

17. The method of claim 16, wherein receiving a selection of acceptable video portions further comprises:
receiving a selection of a linear order of the acceptable video portions from the user.

18. The method of claim 10, wherein the user selects the type of edit point from a list of suggested types of edit points.

19. The method of claim 18, wherein the list of suggested types of edit points comprises;
   a particular time in the video;
   a specific sound;
   a type of action; and
   an introduction of multimedia.

20. The method of claim 10, wherein the new video further comprises:
   at least one transition image.

21. The method of claim 20, wherein the at least one transition image comprises:
   a name of the selected edit point;
   a time the selected edit point occurred; and
   a number of the video portion.

* * * * *